(12) United States Patent
McKenzie et al.

(10) Patent No.: US 10,270,142 B2
(45) Date of Patent: Apr. 23, 2019

(54) COPPER ALLOY METAL STRIP FOR ZINC AIR ANODE CANS

(71) Applicant: Spectrum Brands, Inc., Middleton, WI (US)

(72) Inventors: Rodney Stuart McKenzie, Madison, WI (US); Jeffrey A. Poirier, Madison, WI (US)

(73) Assignee: ENERGIZER BRANDS, LLC, St. Louis, MO (US)

( * ) Notice: Subject to any disclaimer, the term of this patent is extended or adjusted under 35 U.S.C. 154(b) by 477 days.

(21) Appl. No.: 13/629,084

(22) Filed: Sep. 27, 2012

(65) Prior Publication Data
US 2013/0115530 A1     May 9, 2013

Related U.S. Application Data

(60) Provisional application No. 61/556,580, filed on Nov. 7, 2011.

(51) Int. Cl.
| | |
|---|---|
| *C22C 9/01* | (2006.01) |
| *C22C 9/04* | (2006.01) |
| *C22C 9/06* | (2006.01) |
| *C22C 9/10* | (2006.01) |
| *H01M 2/02* | (2006.01) |
| *H01M 12/04* | (2006.01) |
| *B32B 15/01* | (2006.01) |

(Continued)

(52) U.S. Cl.
CPC .......... *H01M 12/04* (2013.01); *B32B 15/015* (2013.01); *C22C 9/01* (2013.01); *C22C 9/04* (2013.01); *C22C 9/06* (2013.01); *C22C 9/10* (2013.01); *H01M 2/026* (2013.01); *H01M 2/0285* (2013.01); *H01M 2/0227* (2013.01); *H01M 4/42* (2013.01); *H01M 12/06* (2013.01)

(58) Field of Classification Search
USPC .......... 429/245, 27, 406, 501, 164; 428/646, 428/677; 205/102, 263, 633; 204/293; 420/472
See application file for complete search history.

(56) References Cited

U.S. PATENT DOCUMENTS 2,314,882 A * 3/1943 Hensel et al. ................. 428/677
2,495,247 A * 1/1950 Friedman ................ H01M 2/30
                                                          429/174

(Continued)

FOREIGN PATENT DOCUMENTS

| EP | 2559777 A1 * | 2/2013 |
|---|---|---|
| WO | 2002084761 A2 | 10/2002 |
| WO | 2010107679 A2 | 9/2010 |

OTHER PUBLICATIONS

Inert definition; http://www.dictionary.com/browse/inert; 1 page.*

(Continued)

*Primary Examiner* — Ula C Ruddock
*Assistant Examiner* — Anna Korovina
(74) *Attorney, Agent, or Firm* — Foley & Lardner LLP

(57) ABSTRACT

The present disclosure generally relates to a zinc air cell having an anode can made of a copper alloy. The anode can material reduces internal gassing within the electrochemical cell while being compatible with the internal chemistry of the anode and the alkaline electrolyte of the cell itself.

20 Claims, 1 Drawing Sheet

(51) Int. Cl.
*H01M 4/42* (2006.01)
*H01M 12/06* (2006.01)

(56) References Cited

U.S. PATENT DOCUMENTS

| | | | | |
|---|---|---|---|---|
| 2,620,368 | A * | 12/1952 | Ruben | H01M 6/22 |
| | | | | 429/174 |
| 3,017,268 | A * | 1/1962 | Saarivirta | 420/472 |
| 3,402,043 | A * | 9/1968 | Smith | 420/478 |
| 3,923,555 | A * | 12/1975 | Shapiro | C22F 1/08 |
| | | | | 148/681 |
| 3,984,166 | A * | 10/1976 | Hutchison | H01L 23/047 |
| | | | | 174/16.3 |
| 4,071,359 | A * | 1/1978 | Cheskis et al. | 420/489 |
| 4,242,132 | A * | 12/1980 | Shapiro | C22C 9/04 |
| | | | | 148/434 |
| 4,249,942 | A * | 2/1981 | Shapiro et al. | 420/480 |
| 4,264,360 | A * | 4/1981 | Parikh et al. | 420/470 |
| 4,409,295 | A * | 10/1983 | Smith, III | H01H 1/04 |
| | | | | 200/262 |
| 4,589,938 | A * | 5/1986 | Drosdick | C22C 9/06 |
| | | | | 148/435 |
| 4,592,891 | A * | 6/1986 | Nishikawa et al. | 420/491 |
| 4,791,036 | A * | 12/1988 | Schrenk et al. | 429/178 |
| 5,279,905 | A * | 1/1994 | Mansfield et al. | 429/406 |
| 6,087,030 | A | 7/2000 | Collien et al. | |
| 6,471,792 | B1 * | 10/2002 | Breedis | C22C 9/04 |
| | | | | 148/433 |
| 6,569,563 | B2 | 5/2003 | Adey et al. | |
| 6,794,060 | B2 * | 9/2004 | Carey et al. | 428/646 |
| 7,005,213 | B2 | 2/2006 | Ndzebet et al. | |
| 7,632,605 | B2 * | 12/2009 | Guo et al. | 429/245 |
| 8,318,340 | B2 * | 11/2012 | Stimits | 429/164 |
| 8,361,288 | B2 * | 1/2013 | Reece et al. | 204/293 |
| 2002/0187391 | A1 * | 12/2002 | Buckle | B32B 15/015 |
| | | | | 429/176 |
| 2008/0102360 | A1 * | 5/2008 | Stimits | H01M 2/0222 |
| | | | | 429/131 |
| 2008/0155813 | A1 | 7/2008 | Dopp et al. | |
| 2010/0047666 | A1 | 2/2010 | Tatsumi | |
| 2011/0048962 | A1 * | 3/2011 | Reece et al. | 205/633 |
| 2012/0052413 | A1 * | 3/2012 | Stimits | 429/501 |
| 2014/0014240 | A1 * | 1/2014 | Okafuji et al. | 148/554 |

OTHER PUBLICATIONS

Corrosion definition; http://www.dictionary.com/browse/corrosion; 1 page.*
How do batteries work? NPL.*
Electrical conductivity NPL.*
Energizer Technical Bulletin NPL.*
Dictionary definition of inert NPL.*
Dictionary definition of corrosion NPL.*
Dictionary definition of electrical contact NPL.*
The free dictionary definition of electrical contact or connector NPL.*
Extended European Search Report issued for European Patent Application No. 12188117.1-1360 (dated Mar. 13, 2013)(6 pages).

* cited by examiner

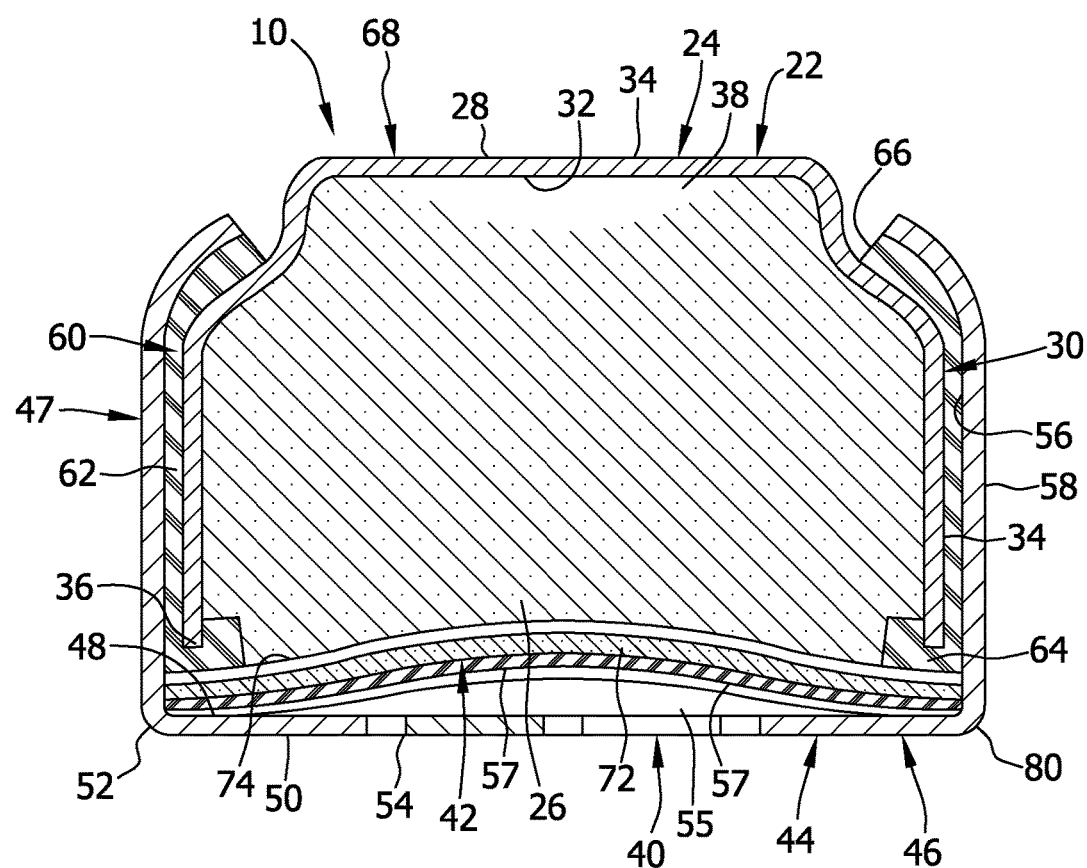

US 10,270,142 B2

COPPER ALLOY METAL STRIP FOR ZINC AIR ANODE CANS

CROSS-REFERENCE TO RELATED APPLICATION

This application claims priority from U.S. Provisional Patent Application Ser. No. 61/556,580 filed on Nov. 7, 2011, the entire contents of which are incorporated herein by reference.

FIELD OF THE DISCLOSURE

The present disclosure generally relates to a zinc air cell having an anode can made of a copper alloy. The anode can material reduces internal gassing within the electrochemical cell while being compatible with the internal chemistry of the anode and the alkaline electrolyte of the cell itself.

BACKGROUND OF THE DISCLOSURE

Zinc air cells typically comprise an anode can and a cathode can. The anode can and cathode can each typically have a cup shaped body with integral closed end and opposing open end. After the necessary materials are inserted into the anode and cathode cans, the open end of the anode can is typically inserted into the open end of the cathode can with electrical insulating material therebetween and the cell securely assembled by crimping. The anode can may be filled with a mixture comprising particulate zinc. Typically, the zinc mixture becomes gelled when electrolyte is added to the mixture. The electrolyte is usually an aqueous solution of potassium hydroxide, however, other aqueous alkaline electrolytes can be used.

Zinc air cells have an anode can top that has traditionally been made from a clad tri-metal sheet having two exposed surfaces—copper to the inside and nickel to the outside of the cell—with a core of stainless steel for strength. If the electrolyte creeps past the copper and around to the stainless steel or nickel layer, then internal gassing will result and later leakage may be found on the external surface of the anode can top, grommet, or outer can. This internal gassing may cause component damage that results in poor cell performance.

There is a need, therefore, for an anode can material that would not suffer from the problems of dissimilar metals reacting with the electrolyte and that can also be compatible with the internal chemistry of the zinc anode and alkaline electrolyte of the cell itself.

SUMMARY OF THE DISCLOSURE

Briefly, therefore, the present disclosure is directed to an electrochemical cell comprising a zinc anode comprising an anode can, wherein the anode can comprises an alloy of copper and at least three metals selected from the group consisting of aluminum, silicon, cobalt, tin, chromium and zinc, a cathode, a gasket disposed between the anode and the cathode, and an electrolyte comprising a solute and an aqueous solvent.

The present disclosure is also directed to a zinc anode comprising an anode can, wherein the anode can comprises an alloy of copper and at least three metals selected from the group consisting of aluminum, silicon, cobalt, tin, chromium and zinc.

The present disclosure is further directed to a method of reducing internal gassing of an electrochemical cell comprising a zinc anode, wherein the zinc anode comprises an anode can, the method comprising forming the anode can of a copper alloy, wherein the alloy comprises copper and at least three metals selected from the group consisting of aluminum, silicon, cobalt, tin, chromium and zinc.

BRIEF DESCRIPTION OF THE DRAWINGS

FIG. 1 is a cross-sectional, schematic view depicting an exemplary electrochemical cell of an embodiment of the present disclosure.

It is to be noted that corresponding reference characters indicate corresponding parts throughout the several views of the drawings.

It is also to be noted that the design or configuration of the components presented in this FIGURE are not to scale and/or are intended for purposes of illustration only. Accordingly, the design or configuration of the components may be other than herein described without departing from the intended scope of the present disclosure. This FIGURE should therefore not be viewed in a limiting sense.

DETAILED DESCRIPTION OF THE DISCLOSURE

In accordance with the present disclosure, an improved electrochemical cell has been discovered for improving internal gassing that may cause component damage, which results in poor cell performance. More specifically, it has been discovered that, through the proper selection of materials from which to make an anode can, the electrochemical cell will avoid the problems associated with dissimilar metals reacting with the electrolyte. In particular, in accordance with the present disclosure, the zinc anode comprises an anode can, which comprises an alloy of copper. The alloy of copper comprises at least three metals selected from the group consisting of aluminum, silicon, cobalt, tin, chromium and zinc. The alloy of copper used to form the zinc anode can not only avoids the internal gassing issues suffered by previous metals used, but also is compatible with the internal chemistry of the zinc anode and alkaline electrolyte of the electrochemical cell itself.

It is to be noted that the electrochemical cell of the present disclosure may be configured in accordance or consistent with cell designs generally known in the art, such as zinc/silver oxide batteries, zinc/manganese dioxide batteries, etc., but for the design improvements provided in detail herein below. For example, in various embodiments the electrochemical cells of the present disclosure may be designed to specifications suitable for a button size battery. In particular, the electrochemical cell may be a zinc-air button cell. In some embodiments, the shape of the cell is such that the anode is held in a somewhat flat or pan-shaped position. In a preferred embodiment, the cell is shaped to have particular application in a hearing aid. Accordingly, generally speaking, an exemplary embodiment of a cell of the present disclosure may be as illustrated in FIG. 1.

As illustrated in FIG. 1, referring specifically to the cell 10, the negative electrode, also referred to as the anode 22, includes an anode can 24 and electrochemically reactive anode material 26 contained therein. The anode can 24 has a top wall 28, and circumferential downwardly-depending side wall 30. Top wall 28 and side wall 30 have, in combination, an inner surface 32 and an outer surface 34. Side walls 30 terminate in a circumferential can foot 36. The top wall 28 and side walls 30 generally define a cavity 38 within the anode can, which cavity contains the anode material 26.

The positive electrode, also referred to as the cathode 40, includes a cathode assembly 42, contained within the cathode can 44. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can, providing avenues for traverse of oxygen through the bottom 46 into the cathode 40 adjacent cathode assembly 42. An air reservoir 55 spaces the cathode assembly 42 from bottom 46 and the corresponding air ports 54. A porous diffusion layer 57 fills the air reservoir 55. Side wall 47 of the cathode can has an inner surface 56 and an outer surface 58.

The anode 22 is electrically insulated from the cathode 40 by a gasket 60. Gasket 60 includes a circumferential side wall 62 disposed between the upstanding side wall 47 of the cathode can and the downwardly-depending side wall 30 of the anode can. A gasket foot 64 is disposed generally between the can foot 36 of the anode can and the cathode assembly 42. A gasket top 66 is positioned at the locus where the side wall 62 of gasket 60 extends from between the side walls 30 and 47 adjacent the top of the cell.

The outer surface 68 of the cell 10 is thus defined by portions of the outer surface 34 of the top of the anode can, outer surface 58 of the side wall 47 of the cathode can, outer surface 50 of the bottom of the cathode can, and the top 66 of the gasket 60.

With the exceptions detailed in the present disclosure, the various components of the electrochemical cell may, in general, be prepared of materials, and using techniques, generally known in the art.

A. Anode

The anode includes an anode active material and an anode can that surrounds the active material. In a preferred embodiment, the anode active material is zinc. In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Thus, this phrase does not include current collectors, electrode leads, etc., that may contain or support the active material.

The function of the anode is to react zinc metal with hydroxyl ions to thereby produce electrons according to the anode half reaction, the reaction correspondingly producing zinc oxide. The locus of such reaction is initially located adjacent the air cathode assembly in a fresh unused cell, and as the cell is used, the locus of reaction moves, generally as a reaction front, from the region of a cathode assembly toward an anode current collector.

The anode can comprises an alloy of copper, which comprises copper and at least three metals selected from the group consisting of aluminum, silicon, cobalt, tin, chromium and zinc. In one suitable embodiment of the present disclosure, the entire anode can comprises the copper alloy.

The alloy of copper is capable of being formed into the shape necessary to be the container for the anode and electrolyte. The top formed from the alloy of copper holds the formulation without gassing within the temperature range that cells normally exhibit in production, storage and use (0° C.-70° C.). Further, the alloy of copper lacks the drawbacks of dissimilar metals that are present in the anode can and that threaten the integrity of the chemistry of the cell.

The selection of an appropriate alloy of copper combined with other metals for the anode can is essential to the present disclosure. In particular, an appropriate alloy of copper will impart strength and corrosion resistance, as well as maintain low contact resistance and a quiescent surface relative to the wetted contact with the anode metal. This, in turn, can eliminate the problem of internal gassing that results from the use of dissimilar metal interfaces with the copper alloy itself as it occurs in the anode tops that are currently used.

Appropriate metals for forming the copper alloy include aluminum, silicon, cobalt, tin, chromium, zinc and other minor constituents that can be selected to be non-reactive to the anode materials. Appropriate metals will impart improved strength, prevent surface oxidation where low contact resistance is maintained, and enhance visual appearance. The metals can be chosen for a particular purpose by determining use conditions and environmental exposures anticipated for the exemplary cells in question.

In one embodiment of the present disclosure, the copper alloy comprises copper in an amount of from about 70% to about 95%, more preferably from about 70% to about 75%, by weight of the alloy. In another embodiment, the copper alloy comprises copper in an amount of about 95%, by weight of the alloy.

The copper alloy may also comprise aluminum. When aluminum is present in the copper alloy, the copper alloy comprises aluminum in an amount of from about 1% to about 5%, preferably from about 2.5% to about 3.5%, and even more preferably about 3%, by weight of the alloy.

The copper alloy may further comprise silicon. When silicon is present in the copper alloy, the copper alloy comprises silicon in an amount of from about 1% to about 5%, preferably about 1.5%, more preferably about 2.0%, by weight of the alloy.

The copper alloy may also comprise cobalt. When cobalt is present in the copper alloy, the copper alloy comprises cobalt in an amount of from about 0.1% to about 1%, preferably about 0.5%, by weight of the alloy.

The copper alloy may also comprise tin. When tin is present in the copper alloy, the copper alloy comprises tin in an amount of from about 1% to about 5%, preferably about 1.5%, by weight of the alloy.

The copper alloy may also comprise chromium. When chromium is present in the copper alloy, the copper alloy comprises chromium in an amount of from about 0.1% to about 1%, preferably about 0.5%, by weight of the alloy.

The copper alloy may also comprise zinc. When zinc is present in the copper alloy, the copper alloy comprises zinc in an amount of from about 20% to about 25%, preferably about 23%, by weight of the alloy.

In one exemplary embodiment of the present disclosure, the anode can comprises an alloy of copper, aluminum, silicon and cobalt. When the anode can comprises this alloy embodiment, the copper can be present in an amount of from about 90% to about 95%, preferably about 95%, the aluminum can be present in an amount of from 2.5% to about 3.5%, preferably about 3%, the silicon can be present in an amount of from about 1.5% to about 2.5%, preferably about 2% and the cobalt can be present in an amount of from about 0.1% to about 0.5%, preferably about 0.40%, by weight of the alloy.

In another exemplary embodiment of the present disclosure, the anode can comprises an alloy of copper, silicon, tin and chromium. When the anode can comprises this alloy embodiment, the copper can be present in an amount of from about 90% to about 95%, preferably about 95%, the silicon can be present in an amount of from 2.5% to about 3.5%, preferably about 3%, the tin can be present in an amount of from about 1% to about 2%, preferably about 1.5% and the chromium can be present in an amount of from about 0.1% to about 0.5%, preferably about 0.4%, by weight of the alloy.

In yet another exemplary embodiment of the present disclosure, the anode can comprises an alloy of copper, zinc, aluminum and cobalt. When the anode can comprises this alloy embodiment, the copper can be present in an amount of from about 70% to about 75%, preferably about 73%, the zinc can be present in an amount of from 20% to about 25%, preferably about 23%, the aluminum can be present in an amount of from about 3% to about 5%, preferably about 3.5% and the cobalt can be present in an amount of from about 0.1% to about 0.5%, preferably about 0.4%, by weight of the alloy.

Preferably, the copper alloy has a thickness of from about 75 microns to about 300 microns, more preferably from about 100 microns to about 200 microns.

In one embodiment of the present disclosure, the copper alloy has a density of from about 0.28 to about 0.33, preferably from about 0.29-0.31, pounds per cubic inch at 68° F.

B. Anode Mix

The electrochemical cell of the present disclosure further comprises an anode mix comprising an electrolyte. The electrolyte comprises a solute and an aqueous solvent.

In general, the anode mix can be any anode mix that is known for use in a zinc electrochemical cell operating in an aqueous alkaline environment, and especially any anode mix used in a button cell.

In general, the anode mix includes about 15% by weight to about 35% by weight potassium hydroxide, about 65% by weight to about 85% by weight particulate zinc, and suitable additives.

Aqueous potassium hydroxide can be used without any additives. A preferred potassium hydroxide is prepared for use in the anode by adding to a quantity of aqueous potassium hydroxide preferably from about 1% to about 2% by weight ZnO. The resulting potassium hydroxide has a fluid consistency resembling that of water. No other additives need generally be used to prepare the potassium hydroxide for use in making the anode mix.

In additional embodiments, the present disclosure provides an inorganic and environmentally safe ionically conductive clay additive to zinc-based anodes that may be used in any alkaline cell to improve cell performance. In particular, it has been discovered that the addition of small amounts of a clay additive, such as Laponite®, into a zinc-based anode extends the service life and increases the operating voltage of the cell. It will be appreciated, however, that other clay additives could be used in accordance with the present disclosure, as described in more detail below.

While Laponite® is the preferred clay additive to the anode mix in accordance with the preferred embodiment, it should be appreciated that other types of clay, both natural and synthetic, may be used so long as the additive is an ionically conductive clay material that improves the transport of hydroxyl ions inside zinc anode matrix during discharge. This, in turn, delays anode passivation and decreases the polarization to provide greater cell performance.

For example, those skilled in the art will recognize that other clays including, but not limited to, those in the Kaolinite group, the Montmorillonite/Smectite group, the Illiet (or Clay-mica) group, the Chlorite group, and bentonite. The additive could further be selected from a group of synthetic clays such as Garamite®, Gelwhite®, Claytone®, Nanoday®, and Permont® clays. More broadly stated, it is appreciated that most clays have in common a hydroxide group, particle charge, and at least one of silicon, aluminum, magnesium and lithium. Such clays are intended to be used in accordance with the present disclosure to achieve the advantages described above.

C. Cathode

1. Cathode Assembly

The cathode of the present disclosure comprises a cathode can assembly. An exemplary embodiment of the cathode assembly 42 is best seen in FIG. 1. An active layer 72 of the cathode assembly is interposed between separator layer and air diffusion layer 57. Active layer 72 ranges preferably between about 50 microns and about 1,250 microns thick, and facilitates the reaction between the hydroxyl ions in the electrolyte and the cathodic oxygen of the air. Separator layer 74 is a micro-porous plastic membrane about 25 microns thick, typically polypropylene, having the primary function of preventing anodic zinc particles from coming into physical contact with the remaining elements of the cathode assembly 42. Separator layer 74 however, does permit passage of hydroxyl ions and water therethrough to the cathode assembly.

Air diffusion layer 57 is preferably a micro-porous hydrophobic polymeric material such as a polytetrafluoroethylene (PTFE) membrane about 25 to about 100 microns thick, which permits passage of air therethrough and which is generally impervious to battery electrolyte. The air diffusion layer 57, in combination with the air ports 54, are used to efficiently transport oxygen to the active reaction surface area of the cathode assembly.

Active layer 72 is further comprised of connecting substratum, namely a conductive woven nickel wire layer (not shown), capable of interfacing, as a current collector, with the cathode can. Carbon preferably forms a matrix surrounding the conductive layer of nickel wire. Nickel is preferred for the conductive layer because nickel exhibits little or no corrosion in the alkaline environment of the zinc-air cell, and also because nickel is an excellent electrical conductor.

The thickness of the cathode assembly between the separator layer 74 and the diffusion layer 57 should desirably be as small as possible. A cathode assembly preferred for use in electrochemical cells of the disclosure can be made as follows. Place, for example, 1000 milliliters of distilled water in a container, and add 19 grams of $KMnO_4$ thereto. Mix this solution for ten minutes. Then slowly add 204 grams of PWA activated carbon having the appropriate particle sizes to the central mix vortex.

PWA activated carbon has the following characteristics: surface area between about 1000 and 1,150 $m^2/g$, apparent density of about 0.51 g/cc., real density of about 2.1 g/cc., pore volume of about 0.90 g/cc., specific heat at 100 degrees C. of about 0.25, and about 65% by weight to about 75% by weight of such material will pass through a wet −325 U.S. mesh screen.

After 10 minutes of mixing, slowly and uniformly, and without interruption, add 51 grams of Teflon® T-30 dispersant to the edge of the mix vortex, and continue mixing for yet another ten minutes at the speed required to maintain a vortex in the mix after the Teflon dispersant is added. Filter the resulting solution through Whatman #1 or equivalent filter paper, and heat to between 100 degrees C. and 140 degrees C., in a mechanical convection drying oven for at least 16 hours, or until dry, to yield a suitable cake of cathode material.

Combine the resulting cathode material with about 4% carbon black and mix for 30 minutes, or until the mix becomes free flowing. Roll the resulting cathode mix between conventional stainless steel roller mills to obtain the active layer 72.

2. Cathode Can

Cathode 40 can be generally comprised of the cathode assembly 42, contained within cathode can 44. Referring to FIG. 1, the side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. In preferred embodiments of the disclosure, the inner surfaces 48 and 56 come together at a sharp corner, such that the inner surface of the intermediate element is of nominal dimension. To the extent the corner material is worked in forming the corner, the corner is work hardened, whereby the corner structure is strengthened with respect to bottom 46 and side wall 47 as the corner structure is formed at intermediate element 80.

The cathode can may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, cobalt and gold. Such materials can be coated as one or more coating layers onto the core layer by, for example, plating, cladding, or other application processes. The ones of such materials providing sufficient strength and ductility can also be used as single layer materials in place of the composite structure which comprehends CRS or other suitable material as a core layer.

Steel strip plated with nickel and nickel alloy is generally used because of cost considerations, and because pre-plated steel strip, which generally requires no post-plating processes, is commercially available. The metal in the can must be both ductile enough to withstand the drawing process, and strong and rigid enough, to tolerate and otherwise withstand the cell crimping and closure process as well as to provide primary overall structural strength to the cell.

Cathode cans, for example, can be made of nickel-plated stainless steel. Other examples of materials for cathode cans include nickel-clad stainless steel; cold-rolled steel plated with nickel; INCONEL (a non-magnetic alloy of nickel); pure nickel with minor alloying elements (e.g. NICKEL 200 and related family of NICKEL 200 alloys such as NICKEL 201, etc.), all available from Huntington Alloys, a division of INCO, Huntington, West Va. Some noble metals may also find use as plating, cladding, or other coating for can metals, including covering steel strip plated with nickel, and mild steel strip subsequently plated with nickel after fabricating the can.

Where multiple layers are used (e.g., CRS) coated on opposing sides with nickel, the present disclosure contemplates additional (e.g. fourth, fifth, etc.) layers, either between the nickel and CRS, or with a nickel layer between the CRS and the additional layer(s). For example, gold, cobalt, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

Where the can is fabricated using a typical raw material structure of nickel/stainless steel (SST)/nickel
/NI/SST/NI/
as the sheet structure, such sheet structure is preferably about 0.005 inch thick, with a thickness range of about 0.003 inch to about 0.012 inch, and a preferred range of about 0.004 inch to about 0.006 inch. In such embodiments, each of the nickel layers represents about 1% to about 10%, preferably about 2% to about 4%, most preferably about 2%, of the overall thickness of the metal sheet in such 3-layer structure.

D. Gasket

The electrochemical cell of the present disclosure further comprises a gasket. The gasket is positioned generally between the cathode can and the anode can. Gasket 60 can perform at least two primary functions. First, the gasket serves as a closure for the cell, to prevent anode material and/or electrolyte from leaking from the cell between the outer surface 34 of the side wall 30 of the anode can and the inner surface 56 of the side wall 47 of the cathode can. Thus, the gasket must possess adequate liquid sealing properties to prevent such leakage. Generally, such properties are available in a variety of resiliently deformable thermoplastic polymeric materials.

Second, the gasket provides electrical insulation, preventing all effective direct electrical contact between the anode can 24 and the cathode can 44. Accordingly, the side wall 62 of the gasket must circumscribe, and provide electrical insulation properties about, the entirety of the circumference of the cell between outer surface 34 and inner surface 56, generally from the top of side wall 47 to the bottom of side wall 30. Similarly, the foot 64 of the gasket must circumscribe, and provide electrical insulation properties about, the entirety of the circumference of the cell between foot 36 of side wall 30, the lower portion of side wall 47, and the outer perimeter portion of the cathode assembly 42. The combination of good liquid sealing properties and good electrical insulation properties is typically achieved by molding known battery-grade nylon polymeric material in the desired configuration.

In one exemplary embodiment of the present disclosure, in order to meet the electrical insulation requirements, the gasket must have good dielectric insulation properties, must have a minimum thickness about side wall 62, and must be free of any pinholes or other imperfections that might permit transmission of electric current between side walls 30 and 47. Thickness for gasket side wall 62 of about 200 to about 250 microns is common in conventional electrochemical cells. Thickness as thin as 100 microns is acceptable for cells of the disclosure, using the same resiliently deformable thermoplastic nylon material as the thicker gaskets of the conventional art.

Depending on the structure of the cell to which the gasket is to be applied, intermediate thicknesses such as, e.g., 150 microns, 140 microns, 127 microns, or the like, may be selected for some cells. However, where cell volume efficiency is a driving consideration, preferred thicknesses are less, for example 120 microns or 110 microns to as thin as 100 microns. Thus, the range of thicknesses for gaskets 60 preferred for use in cells 10 of the disclosure has a lower end of about 100 microns.

The following Example describes various embodiments of the present disclosure. Other embodiments within the scope of the appended claims will be apparent to a skilled artisan considering the specification or practice of the disclosure as described herein. It is intended that the specification, together with the Example, be considered exemplary only, with the scope and spirit of the disclosure being indicated by the claims, which follow the Example.

EXAMPLE

The following non-limiting example is provided to further illustrate the present disclosure.

Example 1

In accordance with the present disclosure, several copper alloys were tested to measure the amount of internal cell gassing that occurred. Specifically, the following embodiments were tested to determine the amount of microliters of gas that escaped during a 21, 24 and 48 hour testing period.

Test alloy #638 is an exemplary embodiment of the present disclosure and comprised an alloy of 95% copper, 2.8% aluminum, 1.8% silicon and 0.4% cobalt, by weight of the alloy.

Test alloy #688 is an exemplary embodiment of the present disclosure and comprised an alloy of 73.5% copper, 22.7% zinc, 3.4% aluminum and 0.4% cobalt, by weight of the alloy.

Test alloy #715 comprised an alloy of 69.4% copper, 30% nickel and 0.4% iron, by weight of the alloy.

Test alloy #752 comprised an alloy of 65% copper, 17% zinc and 18% nickel, by weight of the alloy.

Test alloy #762 comprised an alloy of 59% copper, 29% zinc and 12% nickel, by weight of the alloy.

Test alloy #770 comprised an alloy of 55% copper, 27% zinc and 18% nickel, by weight of the alloy.

The testing procedure included determining the rate of gas evolution for embodiments of zinc in a 40% KOH and 1% ZnO electrolyte. The testing was conducted at room temperature.

Reference serum bottles were filled with 100 ml of the 40% KOH/1% ZnO electrolyte solution. A sleeve stopper is then punctured and a serological pipet was inserted until the 3.5 ml mark was approximately even with the top of the stopper. Then, the sleeve stopper/pipet is inserted into the serum bottles.

After insertion into the serum bottles, the sleeve of the stopper is pulled down over the neck of the serum bottle and the pipet is pushed down into the liquid until the liquid level can be viewed above the top of the sleeve stopper. After examining for trapped air bubbles in the system, the outside of the pipet/bottle assembly is rinsed off with distilled water.

Next, several samples of 100+/−0.1 g of the test alloys are prepared using weighing paper. Then, the test alloys are transferred using a plastic funnel into 100 ml serum bottles. The serum bottles are then filled with 86 ml of the 40% KOH/1% ZnO electrolyte solution.

The sleeve stopper/pipet assembly process for the reference serum bottles is then repeated (as previously described elsewhere in this application). Ten (10) minutes after insertion of the pipet/stopper assembly, initial electrolyte levels were recorded in the pipets of both the reference and the test alloy samples.

Table 1 depicts the results of the internal gassing tests for each test alloy.

TABLE 1

| Test Alloy | 21 hours | 24 hours | 48 hours |
|---|---|---|---|
| #638 | 440 μL of gas | 510 μL of gas | 820 μL of gas |
| #688 | 440 μL of gas | 520 μL of gas | 900 μL of gas |
| #715 | 1100 μL of gas | 1280 μL of gas | 2470 μL of gas |
| #752 | 1210 μL of gas | 1410 μL of gas | 2830 μL of gas |
| #762 | 1020 μL of gas | 1160 μL of gas | 1970 μL of gas |
| #770 | 1970 μL of gas | 2250 μL of gas | 4700 μL of gas |

As disclosed in Table 1, electrochemical cells that comprised anode cans comprising the test alloys #638 and #688 allowed less internal gassing than test alloys #715, #752, #762 and #770. In particular, the exemplary test alloys of the present disclosure allowed less than half the gassing level to escape from the anode, which ultimately leads to an improved cell performance.

It is believed that one of the reasons for this result is that each of the test alloys #715, #752, #762 and #770 include nickel as part of the copper alloy. Nickel is commonly used in the art as part of a cladding with copper applied to a stainless core material, and it is believed that the presence of the nickel is a contributing factor to the excess internal gassing that occurs.

It is known that internal gassing may cause component damage that results in poor cell performance. Thus, the present disclosure has advantageously discovered a method of reducing internal gassing of an electrochemical cell, wherein the zinc anode comprises an anode can and the anode can comprises an alloy of copper and at least three metals selected from the group consisting of aluminum, silicon, cobalt, tin, chromium and zinc.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. An electrochemical cell comprising:
   a zinc anode comprising an anode can, wherein the entire anode can consists of an alloy comprising copper, wherein the alloy is selected from the group consisting of an alloy of copper, aluminum, silicon and cobalt; an alloy of copper, zinc, aluminum and cobalt; and, an alloy of copper, silicon, tin and chromium;
   a cathode;
   a gasket disposed between the anode and the cathode; and,
   an electrolyte comprising a solute and an aqueous solvent.

2. The electrochemical cell of claim 1, wherein the copper is present in an amount of from about 70% to about 95%, by weight of the alloy.

3. The electrochemical cell of claim 1, wherein the aluminum is present in an amount of from about 1% to about 5%, by weight of the alloy.

4. The electrochemical cell of claim 1, wherein the silicon is present in an amount of from about 1% to about 5%, by weight of the alloy.

5. The electrochemical cell of claim 1, wherein the cobalt is present in an amount of from about 0.1% to about 1%, by weight of the alloy.

6. The electrochemical cell of claim 1, wherein the tin is present in an amount of from about 1% to about 5%, by weight of the alloy.

7. The electrochemical cell of claim 1, wherein the chromium is present in an amount of from about 0.1% to about 1%, by weight of the alloy.

8. The electrochemical cell of claim 1, wherein the zinc is present in an amount of from about 20% to about 25%, by weight of the alloy.

9. The electrochemical cell of claim 1, wherein the alloy of copper has a thickness of from about 75 microns to about 300 microns.

10. A zinc anode comprising an anode can, wherein the entire anode can consists of an alloy comprising copper, wherein the alloy selected from the group consisting of an alloy of copper, aluminum, silicon and cobalt; an alloy of copper, zinc, aluminum and cobalt; and, an alloy of copper, silicon, tin and chromium.

11. The zinc anode of claim 10, wherein the copper is present in an amount of from about 70% to about 95%, by weight of the alloy.

12. The zinc anode of claim 10, wherein the aluminum is present in an amount of from about 1% to about 5%, by weight of the alloy.

13. The zinc anode of claim 10, wherein the silicon is present in an amount of from about 1% to about 5%, by weight of the alloy.

14. The zinc anode of claim 10, wherein the cobalt is present in an amount of from about 0.1% to about 1%, by weight of the alloy.

15. The zinc anode of claim 10, wherein the tin is present in an amount of from about 1% to about 5%, by weight of the alloy.

16. The zinc anode of claim 10, wherein the chromium is present in an amount of from about 0.1% to about 1%, by weight of the alloy.

17. The zinc anode of claim 10, wherein the zinc is present in an amount of from about 20% to about 25%, by weight of the alloy.

18. The zinc anode of claim 10, wherein the alloy of copper has a thickness of from about 75 microns to about 300 microns.

19. The electrochemical cell of claim 1, wherein the anode can comprises an alloy comprising from about 70% to about 95% copper, from about 1% to about 5% aluminum, from about 1% to about 5% silicon, and from about 0.1% to about 1% cobalt, by weight of the alloy.

20. The electrochemical cell of claim 1, wherein the anode can comprises an alloy comprising from about 70% to about 95% copper, from about 20% to about 25% zinc, from about 1% to about 5% aluminum, and from about 0.1% to about 1% cobalt, by weight of the alloy.

* * * * *